3,615,008
CENTRIFUGAL CLASSIFYING SYSTEM
Smith M. Alpha, St. Mary Parish, La., assignor to Silver Lining Inc., St. Mary Parish, La.
Filed Feb. 17, 1969, Ser. No. 799,569
Int. Cl. B07b 7/083
U.S. Cl. 209—139 A
2 Claims

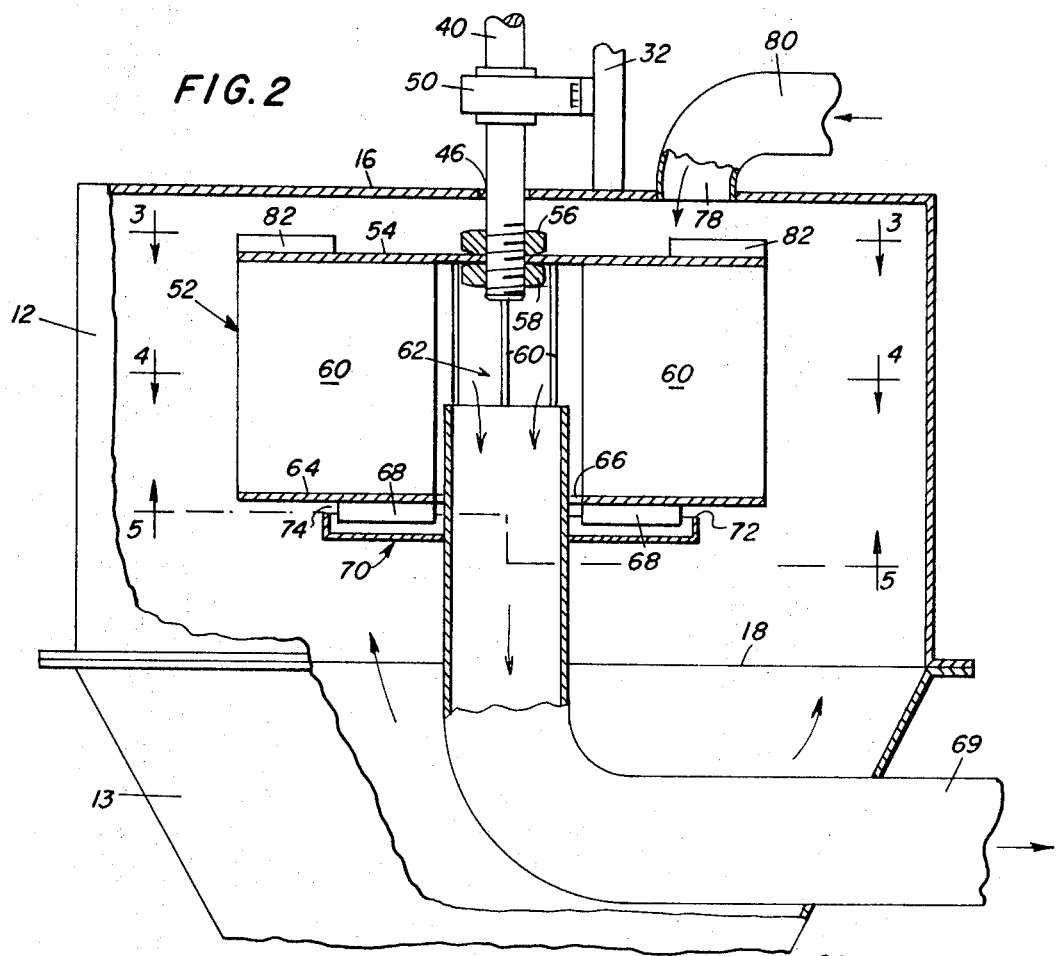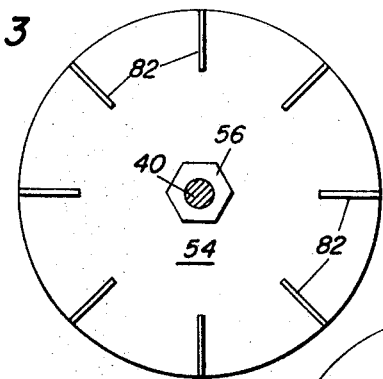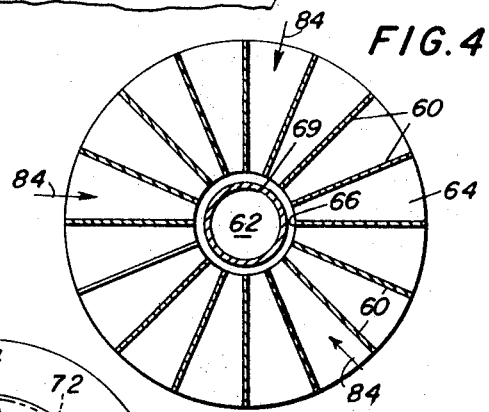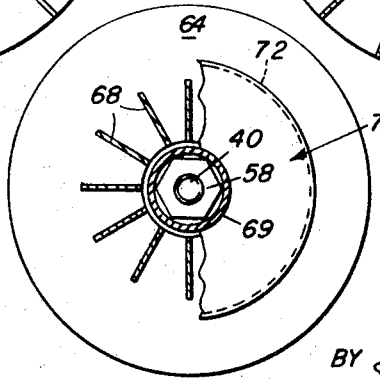

ABSTRACT OF THE DISCLOSURE

This disclosure relates to a centrifugal classifying, or particle separation, system wherein solid particles are admitted to a rotating distributor plate. Centrifugal force throws the particles off the plate radially outwardly toward the sides of a cylindrical housing, and thus into a stream of air flowing upwardly and into a rejector mechanism. This mechanism is a cylindrical fan of the "squirrel cage" type, having a large number of vertically aligned blades around its circumference. Air is fed into the housing surrounding the rejector drum and flows through the blades to a discharge chamber located inside the rejector, carrying with it particles of the material being thrown off the distributor plate. The size of the particle entrained in the air flow and carried into the discharge chamber will depend upon the rate of flow and upon the speed of rotation of the rejector blades. The particles not entrained and those prevented from passing through the rejector blades will fall to the bottom of the housing for removal, and in this manner the desired particles may be separated from the remainder.

BACKGROUND OF THE INVENTION

This invention relates to an improved centrifugal force particle classifier for the separation of particles of a specific size and density.

Classifying and separation systems are necessary in the production of finely divided marble, clay, barites, oyster shell, corn flower, talc, aluminum powder, granite, mica, carbon black and the like wherein a sharp classification of particles of extremely small size must be obtained. The centrifugal classifiers which are presently known and used in industry are not capable of producing uniform separation of fine particles from larger, unwanted, particles. Further, the prior art devices are not easily regulated to control the size of the particles being separated, and often are unable to provide the sharp distinctions between particle sizes which are necessary for proper separation.

SUMMARY OF THE INVENTION

It is, therefore, an object of this invention to provide a centrifugal classifier which will overcome the difficulties of the prior art by separating mixtures of particles into more uniform lots than was heretofore possible.

Another object of this invention is to provide a classifying and separation system which can be controlled so that various sizes and densities of particles can be selected.

These and other objects that will become apparent from what follows are accomplished in the present invention through the use of a centrifugal force classifier including a rotary distributor plate which throws a mixture of particles radially outward by centrifugal force toward the sides of a cylindrical casing and into a stream of air which is admitted into the lower part of the casing. The air flows upwardly toward a rejector mechanism and picks up particles being thrown from the distributor plate. The rejector mechanism includes a plurality of vertical, radially extending blades sandwiched between the distributor plate and a spaced closure plate to form a cylindrical fan. The air stream containing the suspended particles flows through the rejector mechanism where only a selected size of particle will pass the rotating rejector blades. The speed of the blades and the rate of air flow combine to allow only the selected particle size to be picked up and carried through the rejector to a collection pipe where they are conveyed to a collection bin outside the classifier. Since the size of the particles to be collected will be determined by the rate of air flow and by the speed of rotation of the rejector mechanism, variation of these factors permits accurate selection and separation of the desired particles. The particles not suspended in the air stream and those rejected by the rejector mechanism will fall to the bottom of the casing for removal.

BRIEF DESCRIPTION OF THE DRAWINGS

The foregoing and additional objects, features and advantages of the invention will be apparent to those skilled in the art from the following detailed description of a preferred embodiment thereof, taken with the accompanying drawings, in which:

FIG. 2 is an enlarged cross-sectional side view of a rejector chamber and a partial cutaway side view of a residue chamber;

FIG. 3 is a top plan view of a distributor plate, showing the arrangement of a plurality of distributor blades as taken on line 3—3 of FIG. 2;

FIG. 4 is a cross-sectional view of a rejector mechanism taken along line 4—4 of FIG. 2 and showing the arrangeemnt of a plurality of rejector blades; and FIG. 5 is a bottom view of a closure plate of the rejector mechanism, taken along line 5—5 of FIG. 2 and showing the arrangement of a plurality of fan blades seen by cutting away a fan blade cover plate.

DESCRIPTION OF A PREFERRED EMBODIMENT

Figure 1:
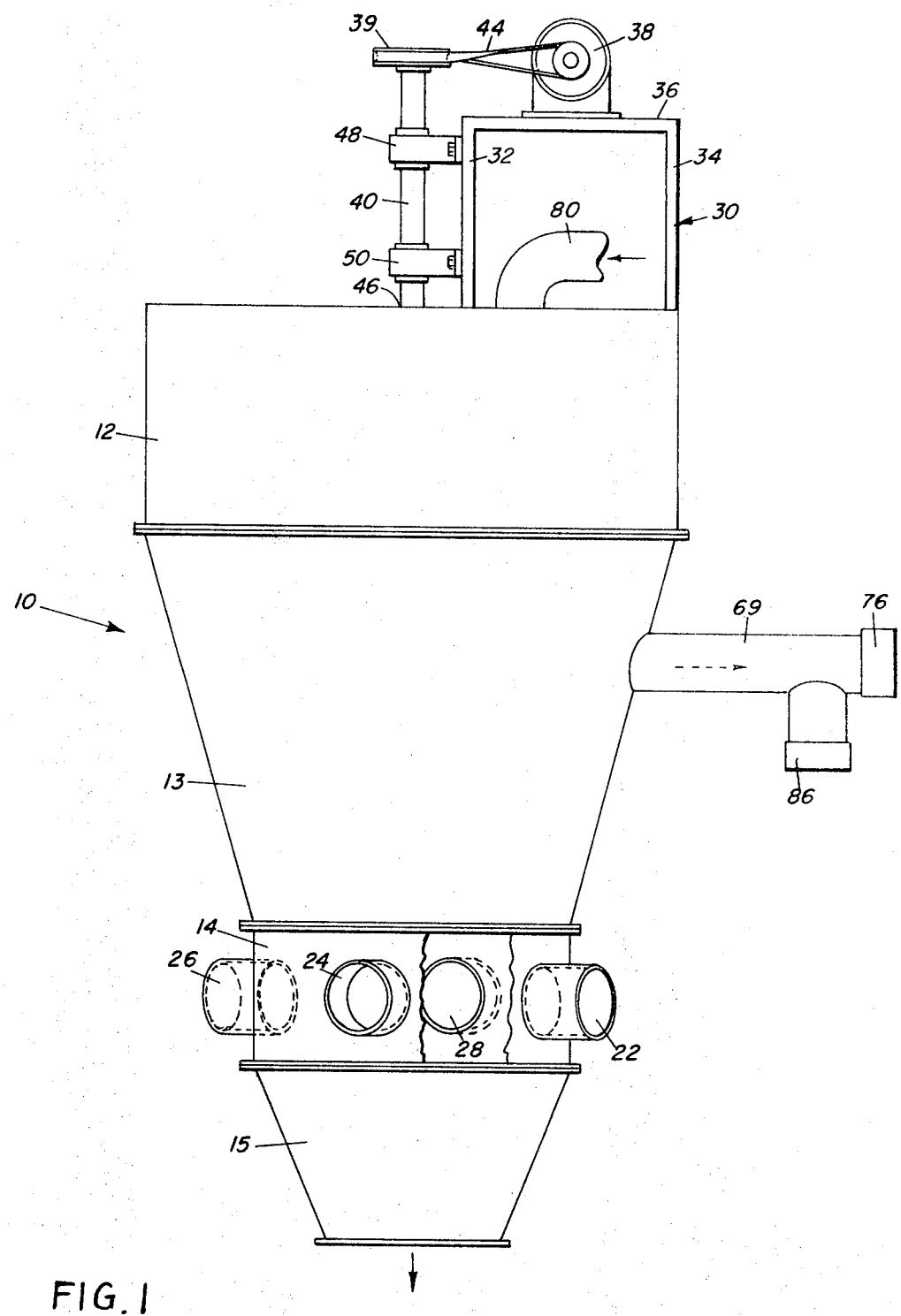
FIG. 1 is a side plan view of a centrifugal classifier according to my invention.

Referring more particularly to the drawings, there is illustrated at 10 a classifier system constructed in accordance with the present invention. The classifier as shown in FIG. 1 includes a rejector chamber 12, a residue chamber 13, an air inlet chamber 14 and a discharge chamber 15, each chamber being enclosed by, and defined by, suitable sections of a generally cylindrical casing. The rejector chamber is cylindrical in shape and includes a top closure plate 16 covering one end, while the opposite end is open as at 18 to allow communication between the rejector chamber 12 and the residue chamber 13. The residue chamber preferably is generally conical in shape, the larger, upper end being connected to the rejector chamber while the smaller, lower end is connected to and communicates with the cylindrical air inlet chamber 14. Connected to and communicating with the lower end of air inlet chamber 14 is the conically-shaped discharge chamber 15. The air inlet chamber 14 provides support for four inlet air pipes 22, 24, 26 and 28 located radially around the air inlet chamber and which preferably feeds air radially into the separator to insure the desired air flow pattern.

Secured to top cover 16 is a support frame 30 having two vertical side plates 32 and 34 and a horizontal mounting plate 36. A driving means such as an electric motor 38 is supported on the mounting plate and is connected by a belt or chain 44 to a pulley 39. The pulley is splined or keyed to a shaft 40 which extends vertically downwardly through an opening 46 (FIG. 2) in the center of the top closure plate 16. Shaft 40 is supported and held in alignment by a bearing 48 which is mounted on the vertical plate 32 at the upper end of the plate adjacent the pulley 39. A thrust bearing 50 to prevent vertical movement of the shaft 40 supports the lower end of the shaft near the closure plate 16. A distributor rejector mechanism 52 (FIG. 2) is secured to the lowermost end of shaft 40, which extends into rejector chamber 12 through opening 46 in closure plate 16. The rejector 52 includes a horizontal upper distributor plate 54 which is rigidly secured to the shaft 40 by locknuts 56 and 58. A plurality of vertical rejector blades 60 are secured to the bottom of distributor plate 54, these blades being generally rectangular in shape and extending radially from the peripheral edge of distributor plate 54. The blades form inwardly decreasing wedge-shaped passages to form a "squirrel cage" fan, but the blades do not extend to the center of distributor plate 54, the inner edges of the blades thereby forming a circular cavity 62 (see FIGS. 2 and 4) within the center of the blades which communicate with the passages. A bottom plate 64 the same size as, parallel to, and spaced from the distributor plate 54 is rigidly secured to the bottom ends of the rejector blades 60, forming, with the distributor plate, an enclosure for the blades 60. An aperture 66 the size of the circular cavity 62 and coaxial with the cavity is located at the center of the bottom plate 64. A plurality of small fan blades 68 are radially arranged around the aperture 66 on the outside of the rejector mechanism, and are carried on bottom plate 64 as shown in FIGS. 2 and 5. A collection pipe 69 extends up through the aperture 66 into the cavity 62 and is sufficiently small to insure clearance between it and the periphery of aperture 66 and the inside edges of the rejector blades 60. A fan blade cover plate 70 having an upturned outer edge 72 is secured to the pipe 69 and extends over the fan blades 68 as illustrated in cutaway in FIG. 5 and in cross-section in FIG. 2. Since the rejector mechanism is supported by bearings 48 and 50, and no bearings are required at the lower end of the rotator, a small air gap 74 remains between the edge 72 of the fan blade cover plate and the bottom plate 64, and between pipe 69 and aperture 66 when pipe 69 is in position. There, gaps provide an air path between cavity 62 and chamber 12 which bypasses pipe 69 but also allows unobstructed movement of the fan blades within the fan blade cover plate 70, as shown in FIG. 2.

The collection pipe 69 extends downwardly into the residue chamber 13 and out through the residue chamber wall to an air suction means 76 (FIG. 1) such as a suction fan.

An opening 78 (FIG. 2) in the cover plate 16 provides communication between a feed pipe 80 and the rejector chamber, whereby a mixture of particles to be separated may be supplied to the top surface of distributor plate 54.

FIG. 3 which is a top plan view of plate 54, shows a plurality of distributor blades 82 arranged radially on the upper surface of the distributor plate 54 near the outer periphery thereof. These blades are relatively small in size, and serve only to scatter the particles evenly into the air stream.

The above-described classifier operates in the following manner. A counter flow of air is established in the system by a suction means 76. Air enters the system through the inlet air pipes 22, 24, 26 and 28, flowing vertically through the residue chamber 13 and into the rejector chamber 12. The air stream continues through the spaces or passages between the rejector blades 60, as indicated by arrows 84 (FIG. 4) and into the cavity 62, then downwardly through the collection pipe 69 to the suction fan 76.

The rate of flow of the air stream can be varied by varying the speed of the suction fan 76, by providing adjustable flow control valves in the inlet pipes, in collection pipe 69, or at the outlet from fan 76 or by other suitable means. By regulating the rate of flow, the maximum weight of the particles that will be entrained can be controlled, and where the particles are of approximately the same material, this will permit selection of the particle size to be suspended in the air stream, with some degree of accuracy, although certain non-uniformities show up in this type of selection process.

Rotation of the rejector mechanism 52 by electric motor 38, pulley 39 and the shaft 40 eliminates the non-uniformities in particle selection that are inherent in air stream separators. The speed of rotation of the rejector can be varied by any appropriate means, as by varying the speed of the electric motor 38 or changing the size of the pulley 39. Given a constant air flow, changes in rejector rotation will, within limits, vary the size of the particles which can pass through the spaces between blades 60. This combination of variables permits a wide range of selectivity in the system of the present invention.

As the air stream flows in the system and the rejector mechanism rotates, a mixture of particles is fed onto the rotating distributor plate 54 through feed pipe 80. The mixture is forced toward the edge of the distributor plate 54 by centrifugal force where the distributor blades 82 cause a stream of the mixture to be dispersed from each distributor blade and scattered around the circumference of rejector chamber 12 into the path of the upwardly flowing air stream. The particles which are too heavy to be suspended by the air stream fall through the residue chamber 13 and air inlet chamber 14 into the discharge chamber 15 where they can be removed by appropriate means. The particles which are suspended in the air stream will be carried toward the rotating blades of the rejector. The movement of the blades transversely of the direction of air flow will prevent particles above a predetermined size and weight from passing through the blades, and the blades will thus selectively reject some of the particles entrained in the air stream. The remaining particles will be carried from the rejector chamber through the rejector mechanism 52, through the collection pipe 69 and, before reaching fan 76, will be deposited in a collection bin 86. The particles which will not pass through rejector blades 60, although entrained in the air stream, will eventually be thrown to the outer circumference of chamber 12, and will settle down to discharge chamber 15 for removal. It will be apparent that to vary the size and density of the particles to be collected, the operator can either vary the air stream rate of flow or the speed of rotation of the rejector mechanism, or may change both, thereby permitting accurate selection and separation of particles.

The fan blades 68 provide a dynamic seal around discharge pipe 69, preventing the air stream containing suspended particles from flowing through the gap 74 and through the clearance opening between the collection pipe 69 and the bottom plate 64 into cavity 62. Such a leakage path would permit entrained particles to bypass the rejector blades, and reduce the uniformity of the particle selection process.

If a greater variation in selectivity is desired than can be provided by air flow and rejector speed changes, the present structure makes it easy to substitute one rejector for another with a different blade spacing or with other structural differences which have different effects on entrained particles. Further, the abrasion of the particles on the moving blades will eventually cause wear, and it may become necessary to substitute a new rejector mechanism. This can be accomplished by providing a joint between the rejection chamber 12 and the residue chamber 13. When the residue chamber 13 is lowered away from the rejector chamber 12, the collection pipe 69 will be removed from the cavity 62 in the rejector mechanism 52. Thereafter, the lock nut 58 can be removed from shaft 40, allowing the rejector mechanism to be replaced.

The described embodiment can be modified in numerous ways, as will be apparent from the foregoing. For example, it is within the skill of the art to provide a different means to rotate the rejector mechanism, to provide a different means to produce the air stream such as a blowing rather than a suction means, or to provide a recycling of the air through the system from fan 76 to inlet pipes 22, 24, 26 and 28 after the suspended particles are removed. The number and spacing of the rejector blades, their exact alignment and their shape may also be modified, although in a preferred embodiment it has been found that rectangular rejector blades approximately two inches wide, 12⅞ inches long, ⅛ inch thick, and radially aligned provides the best results. With the present system, 100% classification of particles can be obtained in the range of from four micron maximum size up to about forty mesh maximum size of selected particles. The system eliminates the maldistribution of particles in the air stream and the leakage of unwanted particles into the collector that have characterized prior devices, and provides a very high rate of production, with no stray particles above the classification size selected. The even distribution of particles in the air stream and the location of the distributor insures that all particles will have an opportunity to be entrained in the air stream and will pass by the rejector mechanism at least once.

Thus, there has been provided a new and useful improvement in particle separators and classifiers which, although described in terms of a preferred embodiment, may be modified in numerous ways without departing from the true spirit and scope of the invention as described in the following claims.

I claim:

1. A centrifugal fluid flow separating apparatus for separating and classifying particles of varying sizes and weights comprising:

(a) a casing having an upper cylindrical portion and a lower conical portion, said upper portion forming a rejection chamber, said lower portion forming a residue chamber;

(b) a distributor-rejector wheel rotatably mounted in said upper rejector chamber, said distributor-rejector wheel including upper and lower parallel, spaced discs, a plurality of radially disposed rejector blades secured between said discs which extend from the peripheral edge of said discs and terminate a predetermined distance from the axis of rotation of said wheel so that a central cavity is formed in said wheel, said rejector blades defining inwardly decreasing wedge-shaped passages which communicate with said central cavity, and a plurality of spaced, radially disposed distributor blades secured to the upper surface of said upper disc, said lower disc having a central aperture communicating with said central cavity;

(c) an inlet feed pipe extending through said upper portion of said casing for depositing articles on said upper surface of said upper disc, the rotation of said wheel causing a portion of said particles to be dispersed radially from said upper disc at each of said distributor blades;

(d) a collection pipe extending into said casing through said lower conical portion, the inside end of said collection pipe extending into the central cavity of said wheel;

(e) a drive means associated with said casing for rotating said distributor-rejector wheel;

(f) means for inducing an air stream within said casing, said air stream flowing from the residue chamber into said rejector chamber and through said passages in said wheel into said collection pipe, thereby producing a counter flow in said casing to entrain particles of selected weights which are dispersed at said distributor blades and carry said entrained particles into said rejector wheel, said rejector blades allowing particles of a selected size and smaller to pass through said wedge-shaped passage into said central cavity and said collection pipe; and (g) sealing means comprising a plurality of fan blades secured to the outside surface of said bottom plate and extending radially from the edge of said aperture, a fan blade cover plate secured to said collection pipe extending across said fan blades and having its peripheral edge turned up to form a small gap between said upturned edge and said bottom plate when said collector pipe is seated in said cavity.

2. The apparatus of claim 1, further including means to vary the speed of rotation of said rejector means and flow control means to vary the rate of flow of said air stream.

References Cited

UNITED STATES PATENTS

| | | | |
|---|---|---|---|
| 3,384,238 | 5/1968 | Alpha | 209—144 X |
| 2,276,761 | 3/1942 | Carey | 209—144 |
| 3,089,595 | 5/1963 | Kaiser | 209—148 X |
| 3,371,782 | 3/1968 | Meyer et al. | 209—148 X |
| 3,371,783 | 3/1968 | Meyer et al. | 209—148 X |

FOREIGN PATENTS

| | | |
|---|---|---|
| 497,966 | 1/1939 | Great Britain. |

FRANK W. LUTTER, Primary Examiner

R. J. HILL, Assistant Examiner

U.S. Cl. X.R.

209—144, 148